US012661673B2

(12) United States Patent
Bilquez

(10) Patent No.: US 12,661,673 B2
(45) Date of Patent: Jun. 23, 2026

(54) FLUID PRODUCT DISPENSER

(71) Applicant: APTAR FRANCE SAS, Le Neubourg (FR)

(72) Inventor: Sébastien Bilquez, Marcilly sur Eure (FR)

(73) Assignee: APTAR FRANCE SAS, Le Neubourg (FR)

( * ) Notice: Subject to any disclaimer, the term of this patent is extended or adjusted under 35 U.S.C. 154(b) by 193 days.

(21) Appl. No.: 18/720,266

(22) PCT Filed: Dec. 15, 2022

(86) PCT No.: PCT/FR2022/052367
§ 371 (c)(1),
(2) Date: Jun. 14, 2024

(87) PCT Pub. No.: WO2023/111462
PCT Pub. Date: Jun. 22, 2023

(65) Prior Publication Data
US 2025/0153207 A1 May 15, 2025

(30) Foreign Application Priority Data
Dec. 17, 2021 (FR) ...................................... 2113827

(51) Int. Cl.
*B05B 11/02* (2023.01)
*B05B 11/04* (2006.01)
(Continued)

(52) U.S. Cl.
CPC .......... *B05B 11/025* (2013.01); *B05B 11/047* (2013.01); *G01F 11/06* (2013.01); *G01F 11/286* (2013.01)

(58) Field of Classification Search
CPC ...... B05B 11/025; B05B 11/047; G01F 11/06; G01F 11/286
See application file for complete search history.

(56) References Cited

U.S. PATENT DOCUMENTS 4,946,080 A * 8/1990 Vesborg ................ G01F 13/006
222/521
8,851,333 B2 10/2014 van de Poll
(Continued)

FOREIGN PATENT DOCUMENTS

DE 102014206568 A1 10/2015
EP 2746733 A1 6/2014
EP 3315922 A1 5/2018

OTHER PUBLICATIONS

International Search Report of PCT/FR2022/052367 dated May 4, 2023 [PCT/ISA/210].
(Continued)

*Primary Examiner* — Donnell A Long
(74) *Attorney, Agent, or Firm* — Sughrue Mion, PLLC

(57) ABSTRACT

A fluid product dispenser comprising a tank and a metering device mounted on the tank, the metering device having a chamber defining an inlet, an abutment, an outlet and a sealing seat, the abutment separated from the sealing seat by a stroke distance; a valve movable inside the chamber over the stroke defined between a rest position, in which the valve is biased by a return force towards the abutment, and an end position, in which the valve is selectively urged onto the sealing seat against the return force by the fluid flowing in the chamber from the inlet to the outlet; and a mechanism for adjusting the stroke of the valve capable of adjusting the stroke distance separating the abutment from the sealing seat. The adjustment mechanism is located in the fluid tank, so that they are inaccessible and cannot be actuated from outside the fluid product dispenser.

15 Claims, 9 Drawing Sheets

Figure 1:
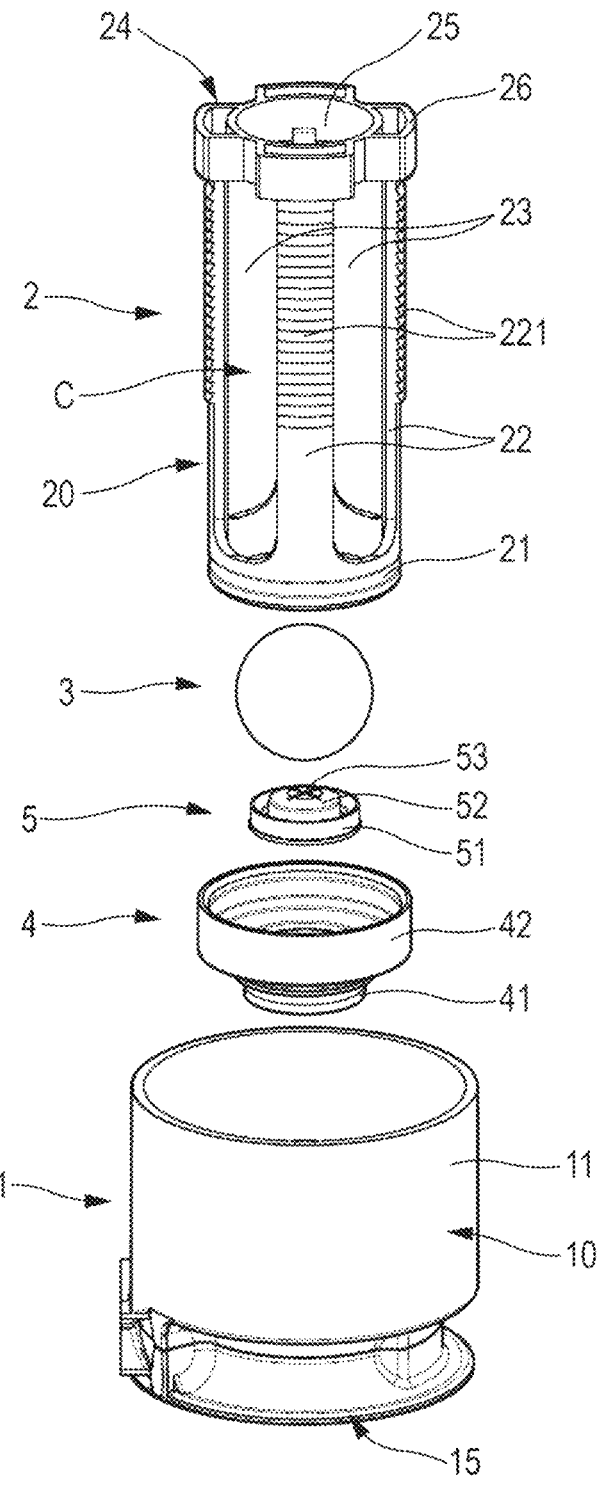

(51) Int. Cl.
  *G01F 11/06* (2006.01)
  *G01F 11/28* (2006.01)

(56) References Cited

U.S. PATENT DOCUMENTS

| | | | |
|---|---|---|---|
| 10,071,836 B2 | 9/2018 | Holroyd et al. | |
| 10,471,452 B2 | 11/2019 | Skillin et al. | |
| 10,488,240 B2 * | 11/2019 | Hoefte | B65D 47/0804 |
| 2017/0023392 A1 * | 1/2017 | Falcon | A47J 47/01 |
| 2019/0118204 A1 * | 4/2019 | Skillin | B65D 47/0833 |
| 2021/0278264 A1 | 9/2021 | Wohlgenannt | |
| 2021/0293599 A1 * | 9/2021 | Paterson | G01F 11/263 |

OTHER PUBLICATIONS

International Preliminary Report on Patentability dated Dec. 4, 2023 of the International Searching Authority in Application No. PCT/FR2022/052367.

* cited by examiner

FLUID PRODUCT DISPENSER

CROSS REFERENCE TO RELATED APPLICATIONS

This application is a National Stage of International Application No. PCT/FR2022/052367 filed on Dec. 15, 2022, claiming priority based on French Patent Application No. 2113827 filed on Dec. 17, 2021.

The present invention relates to a fluid product dispenser comprising a reservoir on which a metering device for fluid, liquid to pasty, of a particular type described, for example, in the document EP2746733 is mounted. This metering device is generally associated with a fluid reservoir which can be manually flattened in order to pump the fluid through the metering device. In a variation, the fluid may also flow through the metering device under gravity alone.

The metering device of the document EP2746733 comprises a chamber defining an inlet, an abutment, an outlet and a sealing seat, the abutment being separated from the sealing seat by a stroke distance. The metering device also comprises a shutter, which may be a floating bead, which can be displaced in the chamber over a stroke defined between a rest position in which the shutter is biased towards the abutment by a restoring force (the density differential between the fluid and the shutter and/or spring), and an extreme position in which the shutter is selectively urged towards the sealing seat against the return force by the fluid circulating in the chamber from the inlet towards the outlet.

In other words, the shutter is imprisoned in the chamber, but can be displaced axially between the abutment and the sealing seat under the opposing actions of the restoring force and the flow of fluid which is directed towards the outlet. Thus, when a user flattens the reservoir, a flow of fluid is directed towards the outlet and as this flow of fluid passes through the chamber, it entrains the shutter with it over a stroke which ends when it comes into sealing contact on the seat. The flow of fluid is then abruptly stopped: the quantity of fluid dispensed corresponds to a pre-defined dose.

In the prior art, the documents EP3315922 A1, US2021278264 A1, U.S. Pat. No. 10,071,836 B2, U.S. Pat. No. 10,471,452 B2, U.S. Pat. No. 8,851,333 B2 and DE102014206568 A1 are known; they all describe dispensers incorporating metering dispensers which are provided with adjustment means that can modify the stroke of the shutter. These adjustment means all comprise a screw thread and an external rotatable actuating member which the user can manipulate by turning it. Thus, the stroke of the shutter can indeed be modified, and in a repeated manner, but the dose of fluid product is not adjusted as a function of the fluid product.

In fact, the dose of fluid is dependent on several parameters and in particular on the characteristics of the fluid, such as its viscosity or its surface tension. Its flow also depends on the configuration of the metering device, but for a given design of metering device, only the characteristics of the fluid come into play. Thus, a metering device may indeed be suitable for a very precise type of fluid, and be unsuitable for another. As a result, the metering devices have to be adapted for each type of fluid on a case by case basis. This is not possible with the dispensers of the documents cited above, because it is the user who varies the stroke of the shutter at will, and not as a function of the characteristics of the fluid product.

The aim of the present invention is to overcome this disadvantage of the prior art by proposing adjustment means which are manipulated only once at the factory before the definitive assembly of the dispenser as a function of the characteristics of the fluid product.

To this end, the present invention proposes a product dispenser comprising a reservoir on which is mounted a metering device comprising a chamber defining an inlet, an abutment, an outlet and a sealing seat, the abutment being separated from the sealing seat by a stroke distance, and a shutter which can be displaced in the chamber over a stroke defined between a rest position, in which the shutter is biased towards the abutment by a restoring force, and an extreme position, in which the shutter is selectively urged towards the sealing seat against the restoring force by the fluid circulating in the chamber from the inlet towards the outlet, the metering dispenser comprises means for adjusting the stroke of the shutter which e capable of adjusting the stroke distance separating the abutment from the sealing seat, characterized in that the adjustment means are located inside the distributer, and more particularly inside the fluid reservoir, in a manner such that they are inaccessible from the outside of the fluid product dispenser. Thus, the invention proposes confining the adjustment means inside the dispenser in a manner such that the user cannot manipulate them. It can also be said that the adjustment means are entirely disposed in the dispenser, in particular in the reservoir, without any part of the adjustment means emerging onto the exterior of the dispenser.

Advantageously, the chamber may be formed by at least two parts attached to each other and between them defining several possible assembly positions corresponding to different stroke distances.

In accordance with a first embodiment of the invention, the chamber may comprise a cage forming the inlet and the abutment, and a head forming the outlet, the cage being integral with the head. Advantageously, the cage may comprise a cage body and a cage cap, the body and the cap between them defining several possible assembly positions corresponding to different stroke distances. The body may form snap fitting notches and the cap may form snap fitting teeth which are capable of coming into snap fitting engagement with the snap fitting notches. In a variation, the body may form a screw thread and the cap may form threads which are capable of coming into threaded engagement with the screw thread. The notches and teeth are preferred, because their mutual positioning is rigid and definitive once the dispenser has been assembled. This is not the case with the screw thread and the threads the mutual positioning of which could shift over time, for example under the action of shocks or of flow of fluid product. The notches and teeth, or more generally the snap fitting, therefore offer durability compared with screw threads and threads.

Advantageously, the cage body and the cage cap are produced as a single piece with bridges of breakable material. The cap may form the abutment. The body and the head may be produced as a single piece.

In accordance with a second embodiment of the invention, the cage and the head may between them define several possible assembly positions corresponding to different stroke distances.

In accordance with another feature of the invention, the metering device may comprise a ring which forms the sealing seat. In the second embodiment, the cage and the ring may between them define several possible assembly positions corresponding to different stroke distances.

The ring may be considered to form part of the cage or of the head.

In accordance with another aspect of the invention, the metering device may further comprise a slit valve, held in place by the cage which advantageously forms the sealing seat, or by a ring which advantageously forms the sealing seat. La position of the slit valve with respect to the bottom position of the shutter may also be defined in order to generate a mechanical movement when sucking back, and therefore cause the bead to detach; under some conditions (nature of the fluid), it may have a tendency to remain stuck to the sealing seat and therefore block the metering device.

In accordance with a third embodiment of the invention, the abutment of the chamber may be formed with at least one line of weakness, at which the abutment can be broken, thereby enabling the stroke distance to be increased. In a variation, instead of breaking a segment of the abutment, it is possible to envisage folding it while it remains attached. The result is the same, namely increasing the stroke distance.

Thus, the metering device may incorporate one or more of the following features:

cap snap fitted or screwed onto the cage body,
abutment in one piece with the cage body,
cage body and cage cap in one piece with breakable bridges,
cage body snap fitted or screwed into the ring,
sealing seat formed by the cage or the ring,
slit valve held by the cage or the ring,
breakable abutment alone or combined with snap fitting or screwing.

The inventive concept of the present invention resides in the fact of being able to adjust the stroke distance of the metering device before assembling the dispenser, by using known techniques such as snap fitting, screwing, rupture or folding.

The invention will now be described in more detail with reference to the accompanying drawings, given by way of non-limiting example, of several embodiments of the invention.

Figure 2:
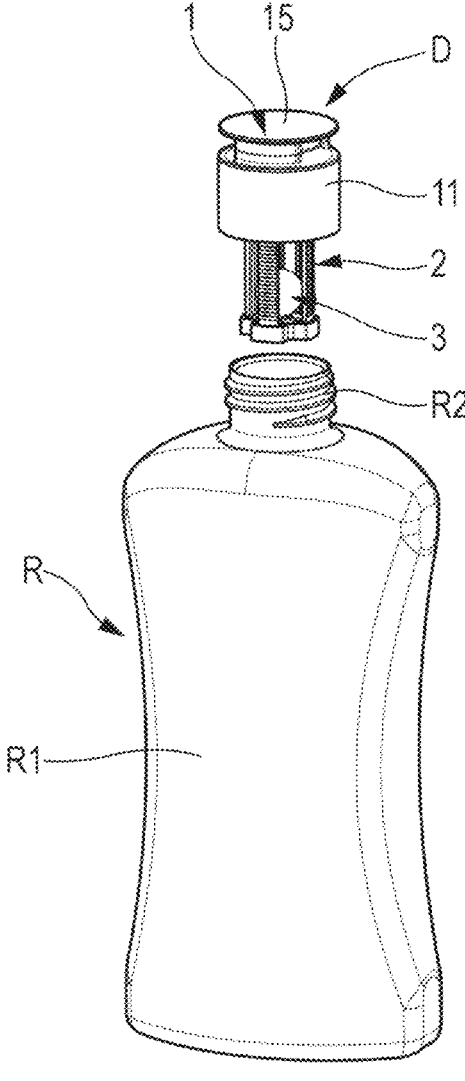
Figure 3:
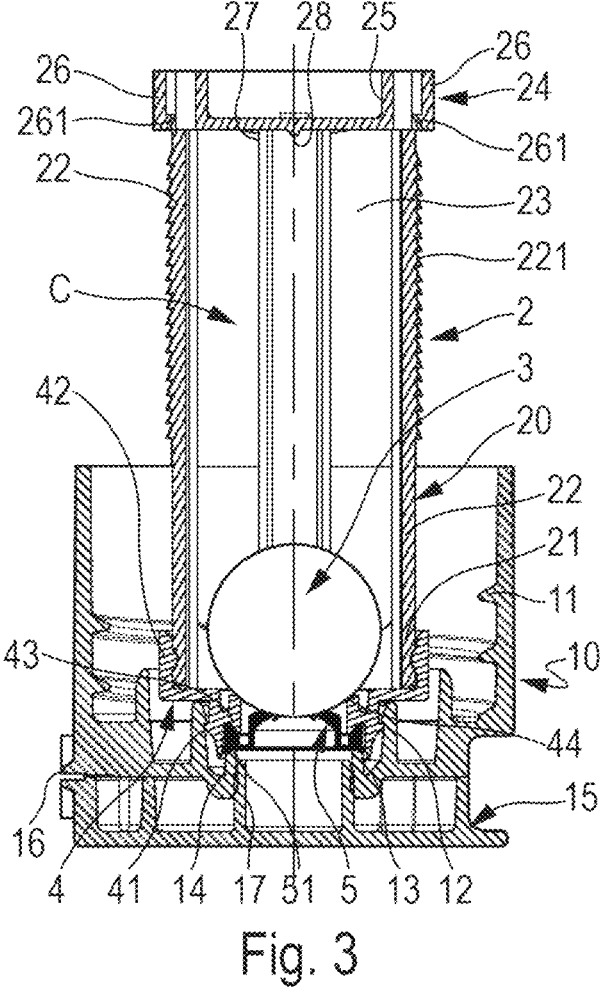
Figure 4:
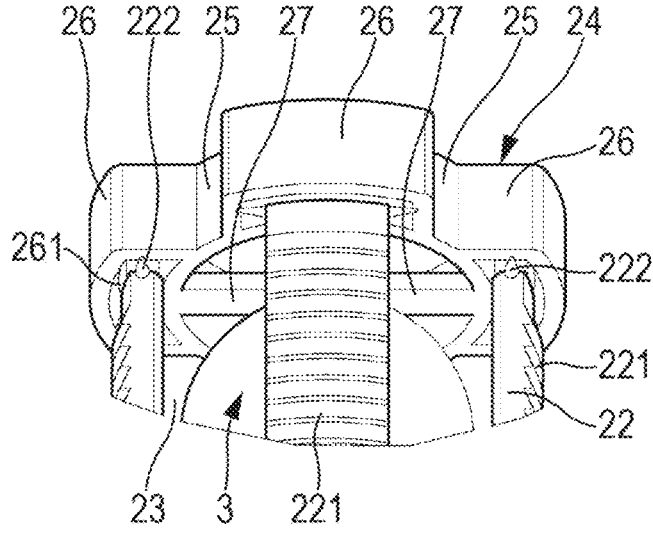
Figure 5:
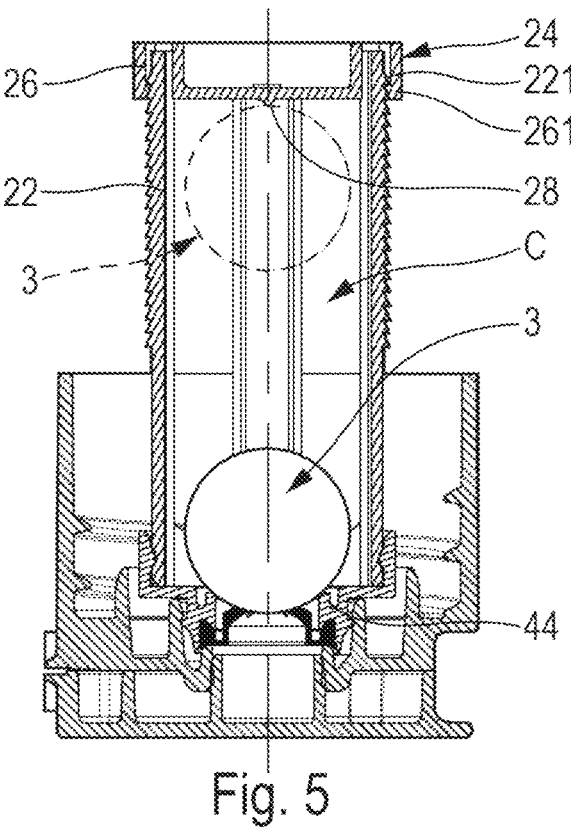
Figure 6:
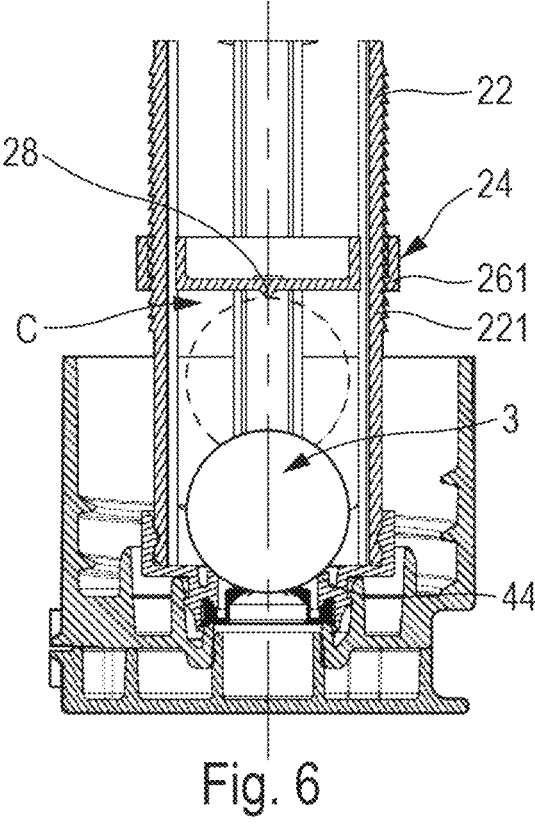
Figure 7:
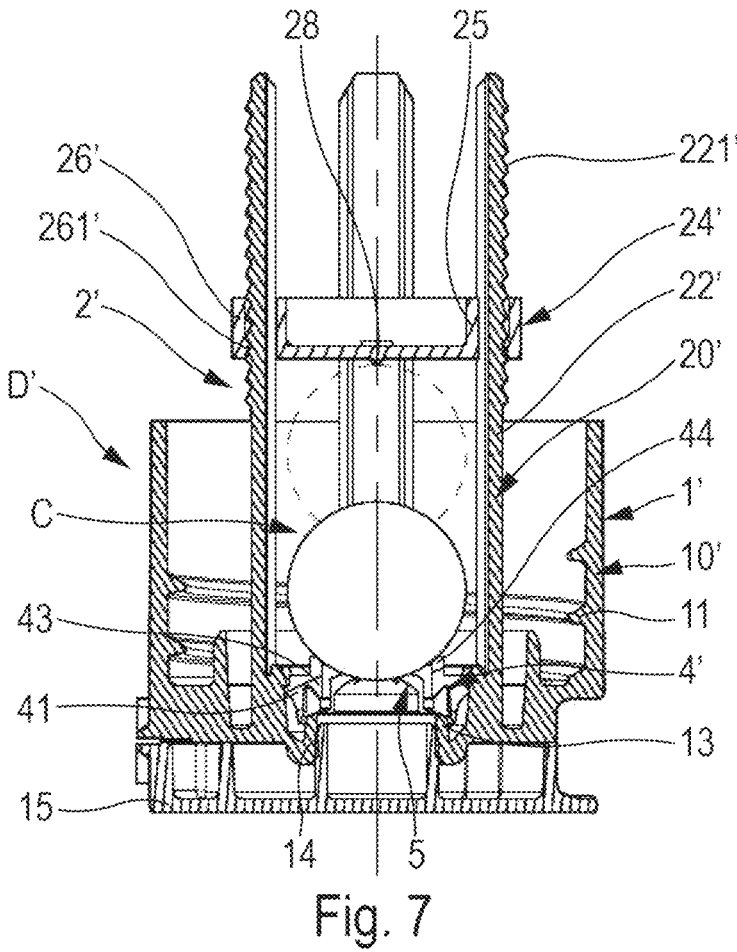
Figure 8:
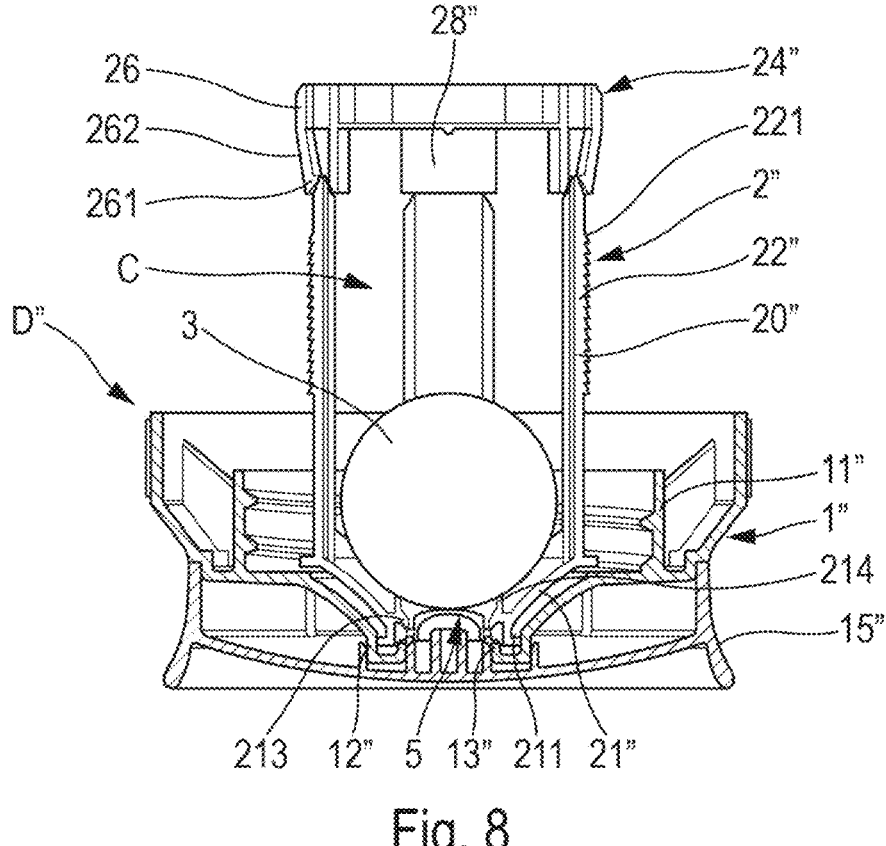
Figure 9:
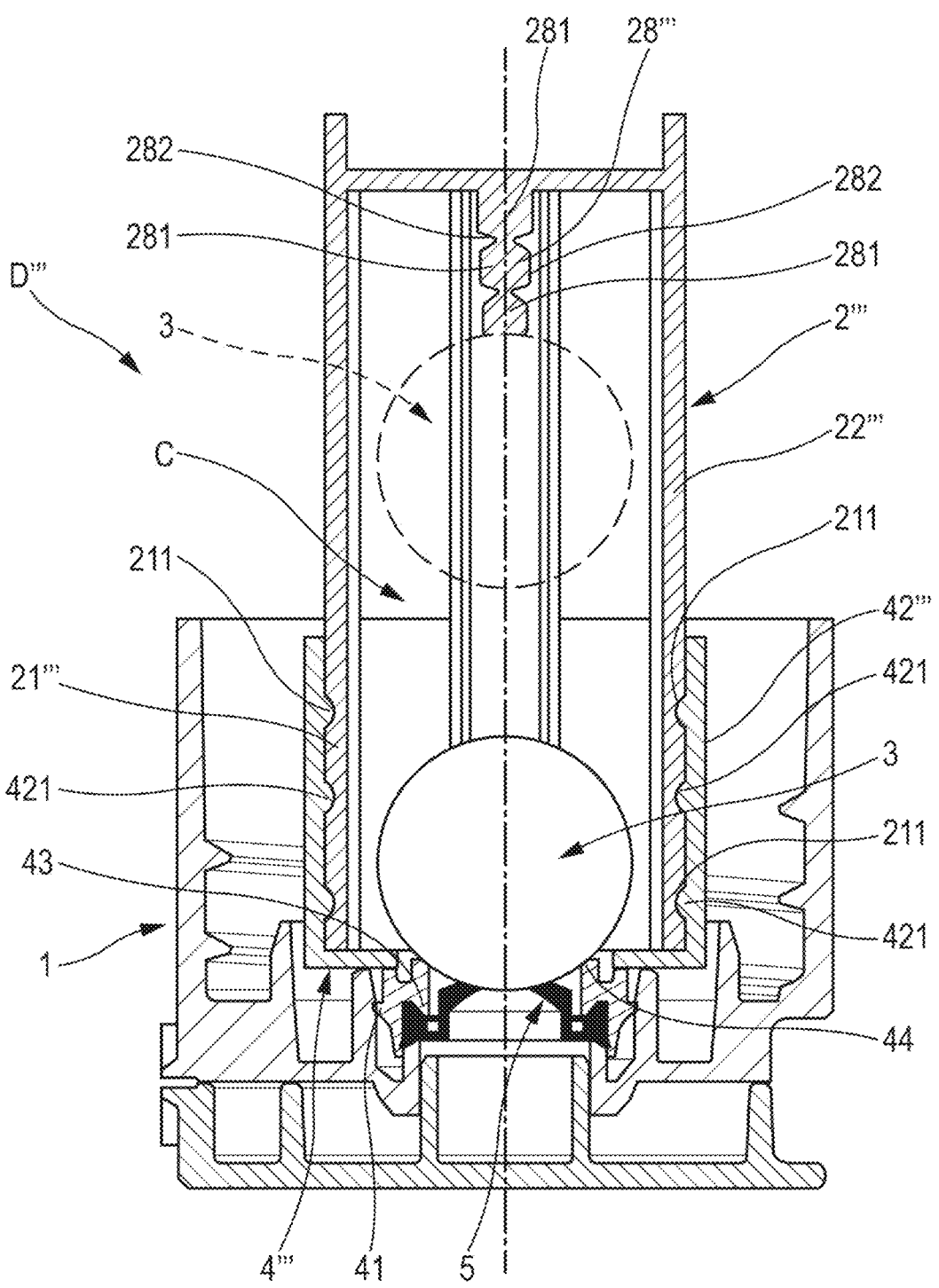

In the figures:

FIG. 1 is an exploded perspective view of a metering device for fluid in accordance with one embodiment of the invention, FIG. 2 is a perspective view of a fluid product dispenser comprising a metering device of the invention, ready to be mounted on a fluid reservoir, FIG. 3 is a vertical cross sectional view through the metering device of FIG. 1 in the mounted state, FIG. 4 is an enlarged perspective view of the upper portion of the metering device of FIG. 3, FIGS. 5 and 6 show the metering device of FIG. 3 in two different configurations, FIG. 7 is a vertical cross sectional view through a metering device in accordance with a second embodiment of the invention, FIG. 8 is a vertical cross sectional view through a dispensing device in accordance with a third embodiment of the invention, and FIG. 9 is a vertical cross sectional view through a metering device in accordance with a fourth embodiment of the invention.

Irrespective of the embodiment, the fluid product dispenser of the invention comprises a reservoir for fluid product R on which a metering device of the invention is mounted.

Reference should firstly be made to FIG. 1 in order to describe the various constituent elements of the fluid metering device D in accordance with the first embodiment of the invention. All of the constituent elements of the metering device may be produced by injection/moulding of an appropriate plastic material.

The metering device comprises a head 1, a cage 2, a shutter 3 in the form of a bead, a ring 4 and a slit valve 5. The ring 4 is securely fixed in the head 1 and the cage 2 is mounted in the ring 4, trapping the slit valve 5 between them and imprisoning the shutter 3 inside the cage 2. The ring 4 may be snap fitted into the head 1 and the cage 2 may be snap fitted into the ring 4. The ring 4 may be considered to form part of the head 1 or the cage 2, given that the ring 4 is the intermediate part between the cage 2 and the head 1.

Thus, the ring 4 comprises a mounting lug 41 which will come into engagement with the head 1 and a mounting cup 42, in which the cage 2 is securely fixed. Preferably, the mounting lug 41 is snap fitted into the head 1 and the cage 2 is snap fitted into the cup 42.

The cage 2 comprises a cage body 20, with which a cap 24 is associated, which can be mounted at different heights on the cage body 20. The cage body 20 and the cage cap 24 together form means for adjusting the stroke of the shutter 3: the cap 24 forms a movable member of the adjustment means and the cage body 24 forms a fixed member of the adjustment means.

The cage body 20 comprises a mounting base plate 21 which is annular in shape, which is intended to be received in a secure manner in the collar 42 of the ring 4, for example by snap fitting. Four legs 22 extend from this base plate 21 and are provided on the outside with snap fitting notches 221 which extend horizontally one below the other over a portion of the height of the legs 22. It could also be said that the notches 221 extend perpendicularly to the longitudinal axis of the body of the cage 2 defined by the legs 22. Here, there are four legs 22 separated by longitudinal axial slots 23. The legs 22 have free upper ends: in other words, they are not joined together at their upper portions.

The cap 24, which forms part of the cage 2, is mounted on the free ends of the legs 22 and comprises four keepers 26 intended for the respective passage of the four legs 22. The cooperation between the cap 24 and the cage body 20 will be described in more detail below.

The shutter 3 here is in the form of a bead, which is advantageously produced in a manner such as to have a lower density than that of the liquid to be dispensed. As an example, the bead 3 may be hollow and produced from an appropriate plastic material. It may be formed by joining two hemispheres. Instead of this bead, other forms of shutters which are capable of being displaced inside the cage 2 may be envisaged. It is also possible to envisage a shutter in the form of a piston biased by a spring, which replaces or reinforces the buoyancy.

The slit valve 5 may be of any design which is entirely conventional with a flexible membrane 52 which is perforated by a slit 53, for example in the form of a cross. The membrane 52 is surrounded by a mounting ring 51 intended to be wedged between the base plate 21 of the cage body 20 and the ring 4.

The cage 2 therefore defines a chamber C, in which the shutter 3 can be axially displaced between the cap 24 and the valve 5.

As already mentioned, the ring 4 is mounted in the head 1 and the cage 2 is mounted on the ring 4, holding the slit valve 5 between them and imprisoning the bead 3 inside the cage 2. The metering device D may then be mounted on a fluid reservoir R, as shown in FIG. 2. The head 1 may, for example, comprise a screw ring 11 intended to come into threaded engagement with a threaded neck R2 of the reservoir R. The reservoir R advantageously comprises a deformable wall R1 that a user can squeeze in order to place the fluid contained in the reservoir R under pressure. Thus, when the user turns the dispenser upside down in order to place the metering device D at the bottom, the fluid contained in the reservoir fills the cage 2 and the shutter 3 floats in the fluid so that it rises to come into contact with the cap 24. A flow of fluid is pumped through the cage 2 by pressing on the deformable wall R1, entraining the shutter 3 with it and displacing it in the direction of the slit valve 5. At the end of the stroke, the shutter 3 shuts off the metering device D and fluid dispensing is then stopped. The operation of the metering device D is identical to that described in the document EP2746733 described above.

Reference will now be made to FIGS. 3 and 4 to describe in detail the structure of the metering device D in accordance with this first embodiment of the invention. The head 1 comprises a head body 10, on which a cover 15 connected to the head body 10 is articulated via a hinge 16. The head body 10 comprises a screw ring 11 provided with an internal screw thread which can cooperate with the threaded neck R2 of the reservoir R of FIG. 2. The head body 10 also comprises a mounting flange 12 which is formed on the inside with a snap fitting profile. The head body 10 also forms an annular supporting edge 13 and an outlet for fluid 14 which is hermetically sealed by a tube 17 formed by the articulated cover 15.

As was briefly described above, the ring 4 comprises a mounting bead 41 which is engaged in the mounting flange 12, advantageously by snap fitting. The ring 4 also comprises a mounting collar 42 which internally defines a snap fitting profile. Furthermore, the ring 4 forms an annular sealing seat 44 on which the shutter 3 can come into sealing contact.

The slit valve 5 is disposed between the ring 4 and the head body 10: more precisely, the mounting ring 51 of the valve 5 is held between the supporting profile 43 of the ring 4 and the annular supporting edge 13 of the head body 10. The flexible membrane 52 is free to be deformed and even to fold back. Its slit 53 opens and closes in response to variations in fluid pressure.

The base plate 21 of the cage body 20 is received inside the mounting collar 42 of the ring 4, advantageously by snap fitting. It should be noted that the ring 4 can be mounted on the cage body 20 and that the assembly can then be mounted on the head body 10. In this case, the ring 4 can be considered to form an integral part of the cage 2. In a variation, the ring 4 may already have been mounted on the head body 10, and the cage body 2 may then be mounted in the ring 4. In this case, the ring 4 may be considered to form an integral part of the head 1.

In the initial state, when it comes out of the mould, the cap 24 is located at the upper end of the legs 22: more precisely, the cap is connected to the legs 22 via bridges of breakable material 222 obtained from moulding. It can therefore be said that the cap 24 is moulded as a single piece with the cage body 20. This is shown in FIG. 4. It can also be noted that the cap 24 forms a border 25 around which the keepers 26 are disposed. The inside of each keeper 26 forms at least one snap fitting tooth 261 intended to come into engagement with the snap fitting notches 221 of the legs 22. In the initial moulding position, the teeth 221 are not engaged with the notches 221. The inside of the border 25 defines a slat 27 which forms an abutment 28 orientated towards the interior of the cage 2. Preferably, two slats 27 can be provided, disposed in a crossed position with the abutment 28 disposed at the intersection of the two slats 27. It should be noted in particular that the cap 24 defines an inlet for fluid through its border 25 between the slats 27. Other inlets are also defined at the level of the slots 23 that separate the legs 22.

The cage 2 with its ring 4 therefore defines a chamber C in which the shutter 3 is imprisoned, however with one axial degree of freedom. In fact, the shutter 3 can be displaced over a maximum stroke defined on the one hand by the abutment 28 and on the other hand by the sealing seat 44. A stroke distance is therefore defined between the abutment 28 and the seat 44. In FIG. 3, the shutter 3 is shown in contact with the seat 44, corresponding to the state when the metering device is in the absence of fluid or is under the action of a flow of fluid passing through. In FIG. 4, the shutter 3 is disposed in contact with the abutment 28, corresponding to a state when the metering device is immersed in a fluid in the absence of a flow of fluid passing through.

Starting from the configuration shown in FIG. 3, it can readily be understood that it is possible to axially displace the cap 24 on the legs 22 after breaking the material bridges 222 which initially connect them together. The teeth 261 of the legs 26 will very rapidly come into snap fitted engagement with the notches 221 of the legs 22. This is shown in FIG. 5. The teeth 261 here are shown in engagement with the first row of notches 221 of the legs 22. This configuration corresponds to a maximum stroke distance separating the abutment 28 from the seat 44. The shutter 3 is shown in contact with the seat, but also, in dashed lines, in contact with the abutment 28. Thus, FIG. 5 shows the two extreme positions of the stroke of the shutter 3.

in FIG. 6, it can be seen that the cap 24 has been axially displaced towards the bottom along the legs 22, in a manner such as to considerably reduce the stroke distance separating the abutment 28 from the seat 44. However, this configuration does not define the minimum stroke distance, since it can be seen that there are still notches 221 below the cap 24.

It will therefore be understood that the adjustment of the stroke distance, and because of this of the stroke of the shutter 3, is carried out very simply by disposing the cap 24 at the desired axial height along the notched legs 22. Thus, the dose of fluid which is dispensed may be adjusted as a function of the nature and the characteristics of the fluid. The desired final positioning of the cap 24 may be set directly as it leaves the mould, at the factory, before mounting the metering device D on the reservoir R. The cap 24, which acts as the mobile member of the adjustment means, is entirely disposed in the reservoir R, so that it is not accessible from the outside of the dispenser and therefore cannot be manipulated by a user.

FIG. 7 represents a second embodiment of the invention which differs from the first in essentially two aspects. Firstly, the cap 24' here is screwed onto the legs 22' and no longer snap fitted. To this end, the insides of the keepers 26' define threads 261' and the outsides of the legs 22' define a screw thread 221'. Apart from this, the axial displacement of the cap 24' remains substantially identical to that of the cap 24 of the first embodiment. Secondly, the cage body 20' here is formed as one piece with the head body 10', which may otherwise be substantially identical to that of the first embodiment. Because this is produced in one piece, the ring 4' does not have a mounting collar, but is otherwise identical in all respects to the ring 4 of the first embodiment.

FIG. 8 shows a third embodiment which principally differs from the preceding two embodiments by the absence of a ring 4 or 4'. In fact, the base plate 21" of the cage body 20" defines a snap fitting profile 211 in its lower portion which is in snap fitting engagement in a mounting flange 12" forming an integral part of the head 1". The cage body 20" also forms a supporting profile 213 which holds the slit valve 5 on an annular supporting edge 13" formed by the head 1". Finally, the cage body 20" forms an annular supporting seat 214, against which the shutter 3 can come to bear in a sealing manner.

Apart from the absence of a ring 4 and the particular configuration of the base plate 21", the other features of the metering device are substantially the same. The cap 24" comprises an abutment 28" and keepers 26 form the teeth 261 at the end of elastic legs 262. The teeth 261 are intended to cooperate with the notches 221 formed on the outer wall of the legs 22".

In this embodiment, the shutter 3 has to be disposed inside the cage body 20" before attaching the cap 24". The cage 2" which is constituted thereby may then be mounted in the head 1", trapping the slit valve 5 between them. The adjustment of the stroke distance is carried out in the same manner as in the preceding embodiments, namely by displacing the cap 24" to the desired axial height along the notched portion of the legs 22".

In FIG. 9, a metering device D'" in accordance with a fourth embodiment of the invention can be seen. The head 1, the shutter 3 and the slit valve 5 may be identical to those of the first embodiment. The ring 4'" differs from the other rings which have already been described in that the mounting collar 42 has been extended and is now in the form of a mounting sleeve 42'" the inside of which defines several snap fitting profiles 421 disposed at different axial heights. The cage 2'" comprises a base plate 21'" the outside of which forms several snap fitting recesses 211 intended to cooperate with the profiles 421 of the sleeve 42'". FIG. 9 shows three profiles 421 and three recesses 211. The bottom of the base plate 21'" is engaged inside the sleeve 42'". However, it should be understood that the base plate 21'" may be engaged less deeply inside the sleeve 42'", while ensuring engagement of the profiles 421 in the recesses 211. Thus, the engagement of the cage 2'" in the sleeve 42'" at different axial heights means that the stroke distance can be adjusted.

In addition or in a variation, the cage 2'" also forms an abutment 28'" the axial extent of which can be adjusted. More precisely, the abutment 28'" comprises several segments 281 connected via lines of weakness or fold lines 282. In this manner, one or more segment(s) 281 can be removed or folded in a manner such as to reduce the axial height of the abutment 28'".

The sleeve 42'" and the abutment 28'" may be made together or separately. When they are made together, this means that the possibilities for adjustment of the stroke distance are considerably increased.

It should be noted that the means of the invention enabling the stroke distance, and because of this the stroke of the shutter 3, to be adjusted have not generated the use of supplemental parts because the adjusting cap 24 can be produced as a single piece with the cage body and the sleeve 42'" is only a result of axially extending the mounting collar 42. It is the same for the adjustable abutment 28'".

In all of the embodiments which have just been described, it should be noted that the adjustment means are always located in the fluid reservoir and are inaccessible from the outside of the fluid product dispenser, so that they can no longer be manipulated once the dispenser has been assembled. In other words, a user of the dispenser cannot actuate the adjustment means of the invention unless it is taken apart, i.e. the metering device is separated from the reservoir.

Because of the invention, a metering device is obtained for which the dose can be adjusted very easily at the factory as a function of the fluid to be dispensed, before definitive assembly of the dispenser.

The invention claimed is:

1. A fluid product dispenser comprising a reservoir for fluid product and a metering device for fluid product mounted on the fluid reservoir, the dispensing device comprising:
   a chamber defining an inlet, an abutment, an outlet and a sealing seat, the abutment being separated from the sealing seat by a stroke distance,
   a shutter which can be displaced in the chamber over a stroke defined between a rest position, in which the shutter is biassed towards the abutment by a restoring force, and an extreme position, in which the shutter is selectively urged towards the sealing seat against the restoring force by the fluid circulating in the chamber from the inlet towards the outlet,
   means for adjusting the stroke of the shutter which are capable of adjusting the stroke distance separating the abutment from the sealing seat,
   the adjustment means is located inside the dispenser in a manner such that they are inaccessible from the exterior of the fluid product dispenser.

2. The dispenser as claimed in claim 1, in which the adjustment means are entirely located inside the dispenser, and advantageously inside the fluid reservoir, in a manner such that a user cannot manipulate them.

3. The dispenser as claimed in claim 1, in which the chamber is formed by at least two parts attached to each other and between them defining several possible assembly positions corresponding to different stroke distances.

4. The dispenser as claimed in claim 3, in which the chamber comprises a cage forming the inlet and the abutment, and a head forming the outlet, the cage being integral with the head.

5. The dispenser as claimed in claim 4, in which the cage comprises a cage body and a cage cap, the body and the cap between them defining several possible assembly positions corresponding to different stroke distances.

6. The dispenser as claimed in claim 5, in which the body forms snap fitting notches and the cap forms snap fitting teeth which are capable of coming into snap fitting engagement with the snap fitting notches.

7. The dispenser as claimed in claim 5, in which the body forms a screw thread and the cap forms threads which are capable of coming into threaded engagement with the screw thread.

8. The dispenser as claimed in claim 5, in which the cap forms the abutment.

9. The dispenser as claimed in claim 5, in which the cage body are produced as a single piece with bridges of breakable material.

10. The dispenser as claimed in claim 5, in which the cage body and the head are produced as a single piece.

11. The dispenser as claimed in claim 5, in which the cage cap is entirely disposed in the fluid product reservoir.

12. The dispenser as claimed in claim 4, in which the cage and the head between them define several possible assembly positions corresponding to different stroke distances.

13. The dispenser as claimed in claim 4, further comprising a slit valve, held in place by the cage which advantageously forms the sealing seat or by a ring which advantageously forms the sealing seat.

14. The dispenser as claimed in claim 1, comprising a ring which forms the sealing seat.

15. The dispenser as claimed in claim 1, in which the abutment of the chamber is formed with at least one line of weakness, at the level of which the abutment can be broken, thereby enabling the stroke distance to be increased.

\* \* \* \* \*